United States Patent [19]

Kita et al.

[11] Patent Number: 5,846,644
[45] Date of Patent: Dec. 8, 1998

[54] LOW FRICTION ENGINE CYLINDER AND PRODUCTION METHOD THEREFOR

[75] Inventors: Hideki Kita, Kanagawa; Yasuaki Unno, Kanagawa-ken; Hideo Kawamura, Samukawa Kouza, all of Japan

[73] Assignee: Isuzu Ceramics Research Institute Co., Kanagawa-ken, Japan

[21] Appl. No.: 383,114

[22] Filed: Feb. 3, 1995

[30]  Foreign Application Priority Data

| Feb. 3, 1994 | [JP] | Japan | 6-031839 |
| Nov. 25, 1994 | [JP] | Japan | 6-315476 |
| Nov. 28, 1994 | [JP] | Japan | 6-317621 |

[51] Int. Cl.$^6$ ..................................................... B32B 17/00
[52] U.S. Cl. .......................... 428/325; 428/328; 428/472; 428/688; 428/701; 384/12; 384/13
[58] Field of Search .................................... 428/688, 472, 428/325, 328, 701; 384/12, 13

[56]  References Cited

U.S. PATENT DOCUMENTS 5,401,585  3/1995  Fujisawa .................................. 428/653

*Primary Examiner*—Timothy M. Speer
*Attorney, Agent, or Firm*—John E. Toupal; Harold G. Jarcho

[57]  ABSTRACT

A slidably engaged surface of a sliding member has a first travel length portion formed of a composite material providing a small contact angle with respect to lubricating oil and an adjoining second travel length portion formed of a composite material providing a higher contact angle with the lubricating oil. The first length portion preferably corresponds to boundary and mixed lubricating areas and the second length portion corresponds to a fluid lubricating area.

13 Claims, 7 Drawing Sheets

# LOW FRICTION ENGINE CYLINDER AND PRODUCTION METHOD THEREFOR

BACKGROUND OF THE INVENTION

The present invention relates generally to a low friction composite material and more specifically, to such a material used for a slidably engaged member lubricated with oil.

Oil lubricated, slidably engaged members such as cylinders and pistons of an internal combustion engine are subject to frictional wear. Wear resistance can be improved by reducing the coefficient of friction between the engaged members. A reduced frictional coefficient is established if an engaged member has good wettability for lubricating oil. To reduce frictional loss of a sliding member, it is effective to use a material having a good wettability for oil on the surface of the sliding member in a boundary lubricating area and in a mixed lubricating area. However, such a material is not effective in a fluid lubricating area.

A wear resistant material disclosed in Japan Patent Laid-Open No. 62-127454 is a composite sintered substance comprising 5 to 25 wt. % of oxide, 2 to 15 wt. % of graphite, and the balance, iron. The disclosed material cannot exhibit the wear resistance and low frictional property in both lubricating areas as described above. In the aforementioned wear resistant material, the oxide is a ceramic such as alumina, which reacts with a component of a detergent contained in the lubricating oil to impede the formation of an oil film, thus increasing the frictional coefficient during sliding movement.

In a low frictional composite material disclosed in Japan Patent Laid-Open No. 63-139044 and Japan Laid Open No. 4-238861, a green body is formed from a mixture of cerium stabilized zirconia powder and a lanthanum β-alumina powder. The green body is sintered at a temperature above 1600° C., and a needle like grain of the lanthanum β-alumina is allowed to grow and thereby enhance fracture resistance. Although the aforementioned composite material exhibits excellent wear resistance it does not provide a sufficiently low coefficient of friction. Furthermore, it is necessary to sinter the green body of the material at a high temperature above 1600° C. in order to grow the needle like grain of the lanthanum β-alumina, thereby necessitating increased time and cost for production.

In view of the aforementioned problems, it is an object of the present invention to provide a low frictional composite material for a sliding member which exhibits high mechanical strength and fracture resistance, a small frictional coefficient, and excellent wear resistance, and which can be sintered at a relatively low temperature.

SUMMARY OF THE INVENTION

According to the present invention a low frictional composite material for a slidably engaged member using zirconia can be sintered at a lower temperature than can a conventional composite sintered substance with cerium stabilized zirconia and lanthanum β-alumina. Iron oxide contained in the low frictional composite material enhances absorption property and wettability to reduce a frictional coefficient of the sliding member.

In the low frictional composite material according to the present invention, iron oxide of less than 17.5 wt. % is contained in a matrix of iron to reduce the tendency of detergent in a lubricating oil to adhere to the surface of the composite material. Accordingly, a stabilized oil film is formed on the surface of the low frictional composite material to reduce its coefficient of friction.

According to one feature of the invention, a slidably engaged surface of a sliding member has a first travel length portion formed of a composite material providing a small contact angle with respect to lubricating oil and an adjoining second travel length portion formed of a composite material providing a higher contact angle with the lubricating oil. The first length portion preferably corresponds to boundary and mixed lubricating areas and the second length portion corresponds to a fluid lubricating area. This featured arrangement minimizes coefficient for the entire length of the sliding member.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

EXAMPLE 1

A low friction composite material used for a slidably engaged member is a sintered body prepared by adding 15 wt. % of α-alumina (α-$Al_2O_3$) and 5 wt. % of lanthanum β-alumina ($La_2O_3$β-$Al_2O_3$)(which mixture is hereinafter identified as LBA) to cerium stabilized zirconia to prepare a raw powder of LBA/$CeO_2$ stabilized $ZrO_2$ composite oxide. To this raw powder is added 10 wt. % of iron oxide providing a composite substance used to prepare a green body (sample) by CIP (cold isostatic press), the green body being sintered at a temperature of between 1300° to 1600° C.

As a Comparative Example, a sintered body sample was prepared by molding a green body by CIP from a material in which iron oxide was not added (an addition amount of iron oxide additive of 0 wt. %) to the raw powder of LBA/CeO$_2$ stabilized ZrO$_2$ composite oxide. The green body sample was sintered at a temperature of between 1300° to 1600° C.

Table 1 below shows the measured results of porosity, 4-point bending strength and fracture toughness for both the sintered body according to Example 1 of the present invention and the sintered body according to the Comparative Example. It will be noted in Table 1 that, in addition to being sintered at a lower temperature, the green body of Example 1 of the invention exhibits lower porosity and higher 4-point bending strength and fracture toughness than does the green body of the Comparative Example.

TABLE 1

| sintering temp. °C. | content of oxide of Fe wt. % | porosity % | bending strength Mpa | fracture toughness Mpa m$^{1/2}$ |
|---|---|---|---|---|
| 1300 | 0 | 10.7 | 220 | 3.4 |
| 1300 | 10 | 1.2 | 480 | 8.4 |
| 1400 | 0 | 5.5 | 300 | 4.2 |
| 1400 | 10 | 1.0 | 530 | 9.5 |
| 1500 | 0 | 2.1 | 420 | 7.8 |
| 1500 | 10 | 0.8 | 500 | 9.1 |
| 1600 | 0 | 0.9 | 510 | 8.9 |
| 1600 | 10 | 3.8 | 310 | 4.4 |

Figure 1:
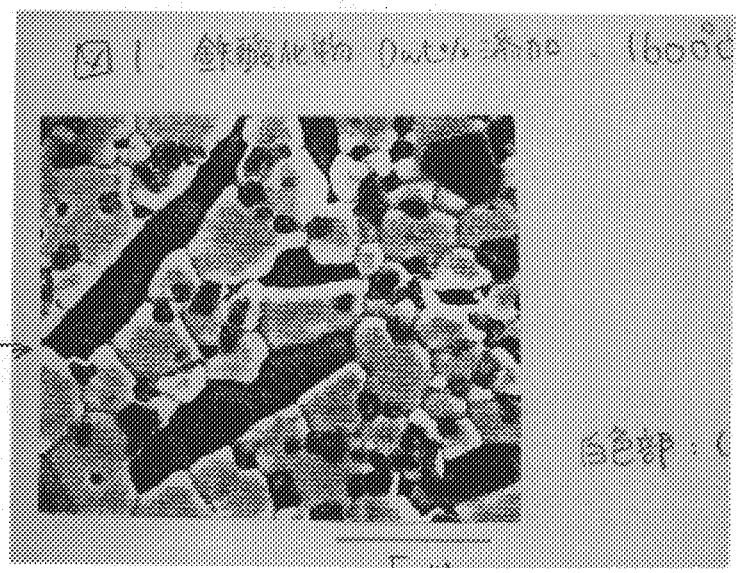
FIG. 1 is a pictorial view of the structure of a conventional low frictional composite material.

FIG. 1 illustrates the structure of the green body obtained by sintering at 1600° C. the Comparative Example material in which iron oxide was not added to the LBA/CeO$_2$ stabilized ZrO$_2$ composite oxide.

Figure 2:
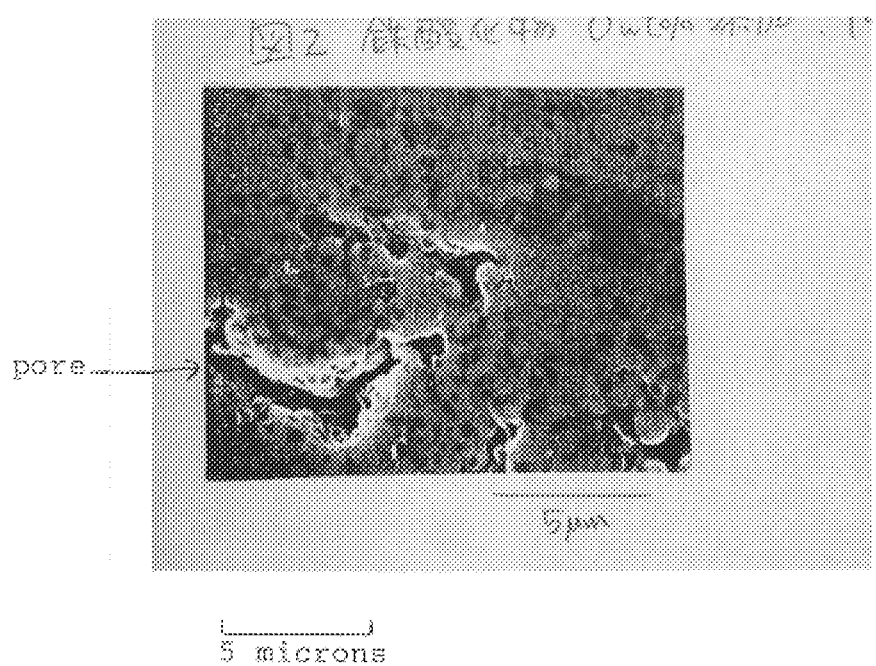
FIG. 2 is a pictorial view of the structure of another conventional low frictional composite material.
Figure 3:
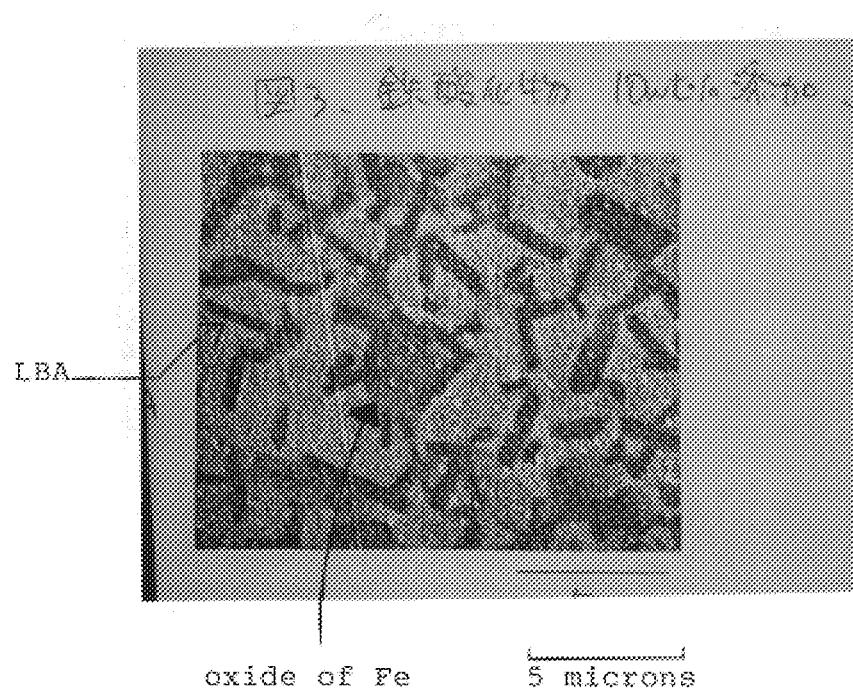
FIG. 3 is a pictorial view of the structure of a low frictional composite material according to a first embodiment of the present invention.

FIG. 2 illustrates the structure of the green body obtained by sintering at 1400° C. the Comparative Example material in which iron oxide was not added. FIG. 3 illustrates the structure of the green body obtained by sintering at 1400° C. Example 1 material in which 10 wt. % of iron oxide was added to the LBA/CeO$_2$ stabilized ZrO$_2$ composite oxide according to the present invention. In the sintered body shown in FIG. 1, LBA grows in needle like form to enhance mechanical properties. However, in the body shown in FIG. 2, with a reduced sintering temperature of 1400° C., the LBA does not grow in needle like grains and many pores exist. Conversely, in the sintered body according to the present invention (FIG. 3), though sintered at a temperature is 1400° C., LBA grows in needle like grains, and the pores are relatively small. Thus, the invention of Example 1 provides a sintered composite oxide for which porosity, 4-point bending strength and fracture toughness all were improved.

EXAMPLE 2

Next, low friction composite materials for sliding members were prepared by producing several kinds of green bodies by CIP from materials in which 0–40 wt. % (except 0 wt. %) of an iron oxide was added to the raw powder of stabilized ZrO$_2$ composite oxide used in Example 1. Each of the Example 2 green bodies was sintered at a temperature of about 1400° C.

Table 2 below shows the measured results of porosity, 4-point bending strength and the fracture toughness, with respect to the sintered bodies (samples) with the iron oxide added to the raw powder of LBA/CeO$_2$ stabilized ZrO$_2$ composite oxide. It is obvious in Table 2 that the sintered bodies with 5 to 30 wt. % of iron oxide additive exhibit significantly better porosity, 4-point bending strength and fracture toughness than those to which iron oxide was not added.

TABLE 2

| content of oxide of Fe wt. % | porosity % | bending strength Mpa | fracture toughness Mpa m$^{1/2}$ |
|---|---|---|---|
| 0 | 5.5 | 300 | 4.2 |
| 5 | 3.8 | 480 | 7.5 |
| 10 | 1.0 | 530 | 9.5 |
| 20 | 0.8 | 500 | 9.4 |
| 30 | 1.0 | 490 | 8.7 |
| 40 | 5.2 | 310 | 5.6 |

The frictional coefficients of the green bodies formed in Example 2 were measured in the following manner. A sliding test plate having a size of 65 mm×15 mm×10 mm was processed from each of the sintered bodies. At that time, a 10-measurements average roughness Rz of the surface of 65 mm×15 mm was finished to be less than 0.4 μm. In addition, there was prepared for sliding engagement with the sliding test plates, a cast iron sliding test pin having a diameter of 8 mm, a length of 25 mm, and a hemispherical end surface with a radius curvature of 18 mm.

The sliding test pin was mounted vertically on each sliding test plate and reciprocated on the surface thereof while synthetic oil was applied for lubrication. During the tests, the sliding test pin was reciprocated at 0.262 m/sec; a load of 1 kgf was applied to the pin; and the temperature of the slide plate was maintained at 150° C.

Figure 4:
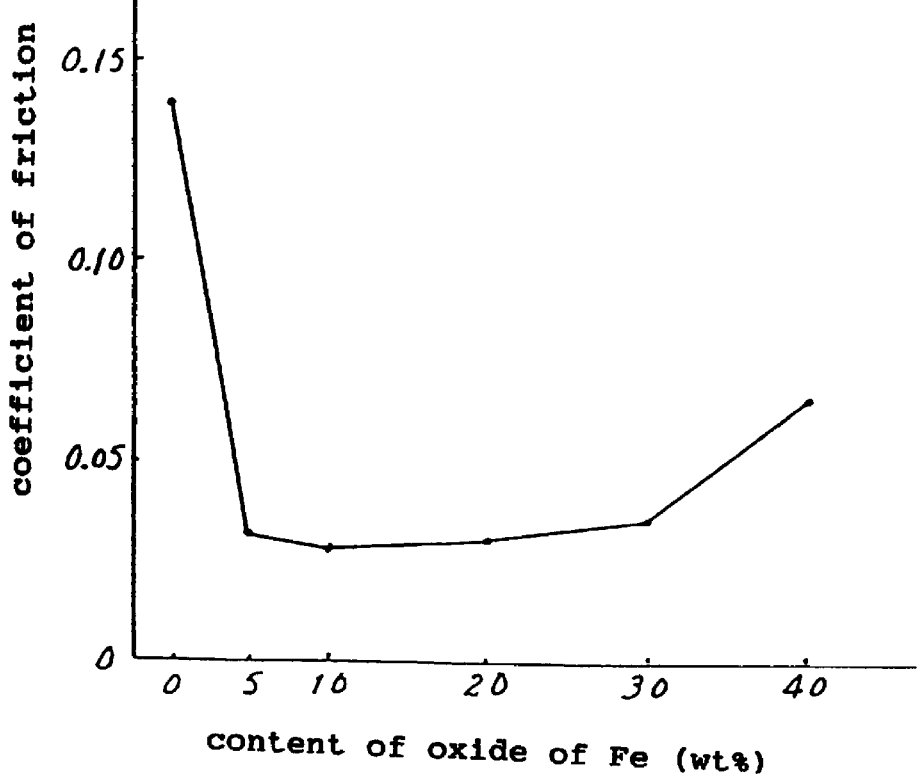
FIG. 4 is a diagram showing a relationship between an amount of iron oxide additive and frictional coefficient of a resultant composite materials according to the first embodiment of the present invention.

FIG. 4 shows the measured frictional coefficient results obtained during the aforementioned sliding tests. It is apparent from FIG. 4 that minimized frictional coefficients are provided by raw materials of which 5 to 30 wt. % of iron oxide was added to the raw powder of the LBA/CeO$_2$ stabilized ZrO$_2$ composite oxide. The lowered frictional coefficients of the sintered substances result from the fact that wettability for lubricating oil is enhanced by the iron oxide additive resulting in the formation of a film of lubricating oil on the surfaces of the sliding test plates. It is assumed for additive amounts of iron oxide above 40 wt. %, pores within the sintered body increase producing on the surfaces of the sintered bodies unevenness that increase frictional coefficients.

SECOND EMBODIMENT

Another low friction composite material for use as a sliding member according to the present invention includes 0 to 20 wt. % (except 0 wt. %) of Fe$_3$O$_4$ contained in a matrix of Fe. This low friction composite material is prepared by producing a sintered green body from a mixture of an iron (Fe) powder, a Fe$_3$O$_4$ powder, a phosphorus (P) powder and a nickel (Ni) powder. The phosphorus and nickel powders are used to establish a finer structure for the sintered bodies.

Figure 5:
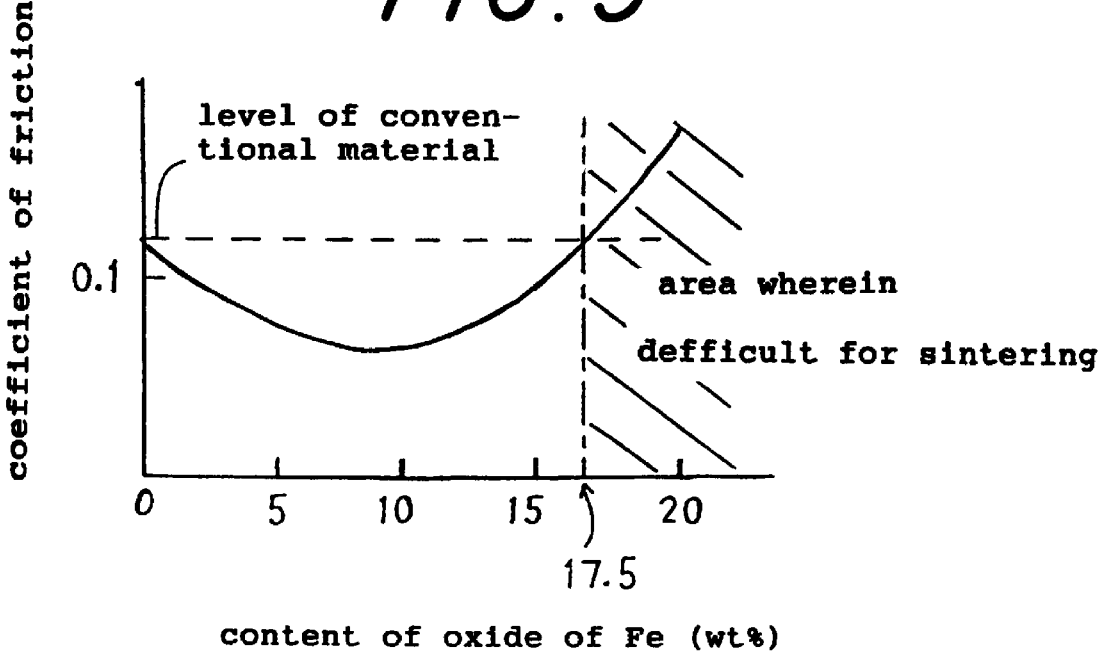
FIG. 5 is a diagram showing a relationship between an amount of iron oxide additive and friction coefficient of resultant composite materials according to a second embodiment of the present invention.

FIG. 5 shows the relationship between frictional properties and the amount of Fe$_3$O$_4$ additive to the matrix of Fe. In FIG. 5, the abscissa and ordinate represent the amount of Fe$_3$O$_4$ additive to the Fe matrix and the frictional coefficient, respectively. It will be seen from FIG. 5 that the frictional coefficient of the composite material according to the invention is smaller than that of conventional composite material if the amount of $Fe_3O_4$ additive is 0 to 17.5 wt. % (except 0 wt. %). In particular, a 10 wt. % amount of $Fe_3O_4$ additive to the matrix of Fe minimizes frictional coefficient. Amounts of $Fe_3O_4$ additive greater than about 10 wt. %, produce increased frictional coefficients because of the fact, apparently, that increased amounts of $Fe_3O_4$ deteriorate sinterability of the composite material so that its surface becomes rough. Accordingly, the amount of $Fe_3O_4$ additive preferably is between 0 to 17.5 wt. % (except 0 wt. %) and more preferably, about 10 wt. %.

Figure 6:
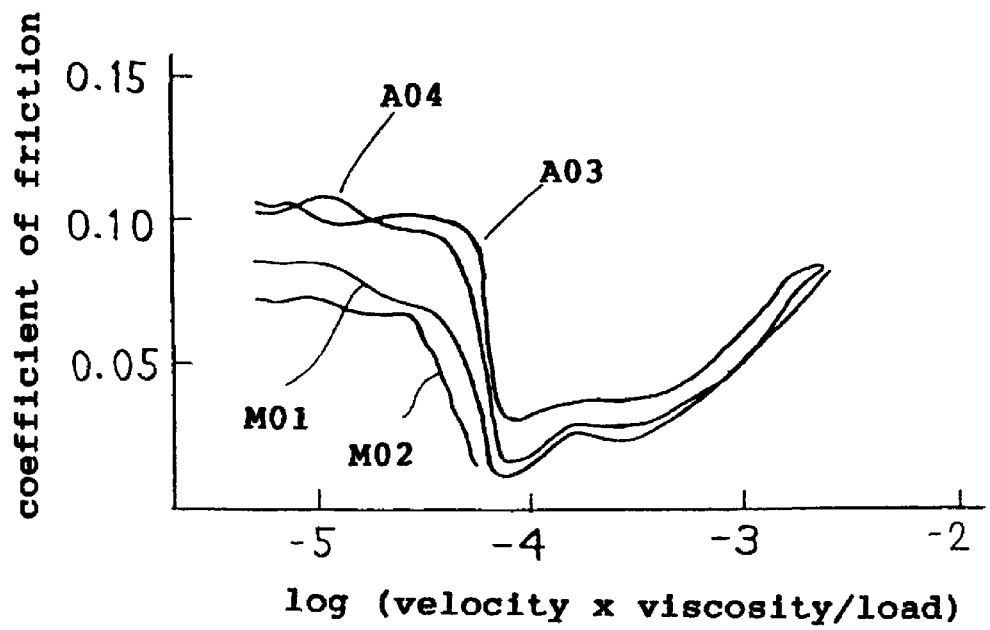
FIG. 6 is a diagram comparing friction characteristics of a low frictional composite materials according to the second embodiment of the invention and conventional composite materials.

FIG. 6 illustrates friction properties of both composite materials according to the invention and conventional composite materials. The abscissa and ordinate represent, respectively, a logarithm of ((velocity×viscosity)/load) and friction coefficient. Curve MO1 represents a composite material containing 10 wt. % of $Fe_3O_4$ additive in the matrix of Fe. The composite material represented by curve MO1 is prepared by producing a sintered green body from a mixture of 79.2 wt. % of Fe powder, 10.0 wt. % of $Fe_3O_4$ powder, 0.8 wt. % of a P powder and 10.0 wt. % of a Ni powder. Inclusion of the P and Ni powders as sintering agents results in a sintered body with fine structure. Curve MO2 represents the composite material represented by curve MO1 including dispersed mica which functions as a solid lubricant to lower friction coefficient of the material.

The conventional materials of curves AO3 and AO4 in FIG. 6 are, respectively, cast iron, and a composite material containing 35 wt. % of $Fe_3O_4$ in a matrix of $Al_2O_3$. It is apparent from FIG. 6 that each of the composite materials according to the invention is small in value of the logarithm of ((velocity×viscosity)/load), i.e., exhibits a small frictional coefficient in the so-called boundary lubricating area and the mixed lubricating area, as compared with the conventional low composite materials. Furthermore, the composite material represented by curve MO2 in FIG. 6 and which includes mica as a solid lubricant exhibits a smaller frictional coefficient than that of the composite material represented by curve MO1.

Figure 7:
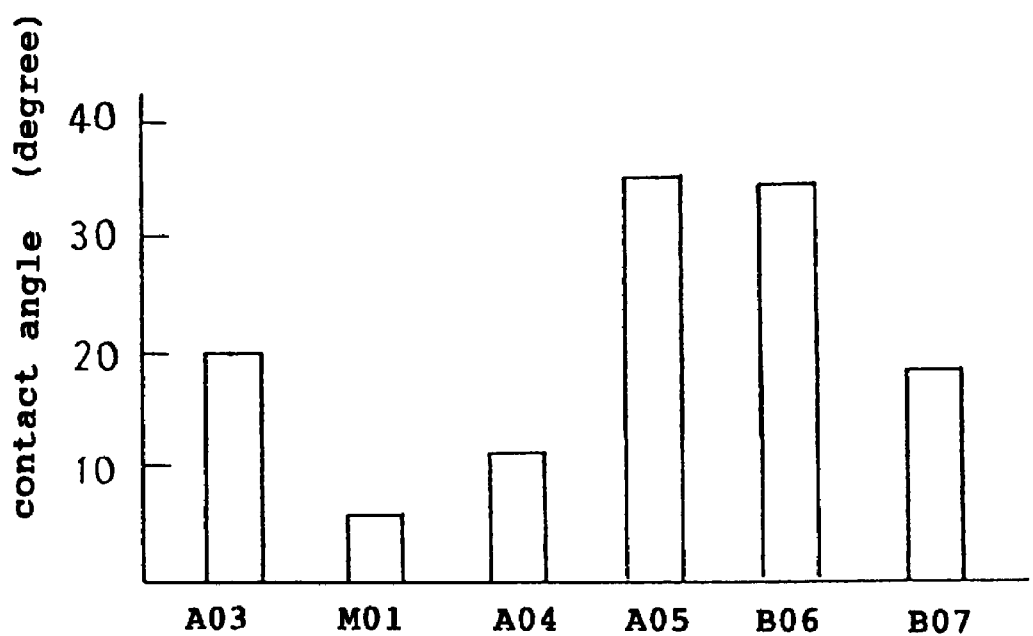
FIG. 7 is a diagram composing contact angles of a lubricating oil with respect to a low friction composite material according to the second embodiment of the present invention and conventional composite materials.

FIG. 7 shows lubricating oil wettability of the composite materials according to the invention. In FIG. 7, the abscissa includes the composite material MO1 according to the invention and the conventional composite materials AO3–AO5; BO6 and BO7, and the coordinate indicates a contact angle formed between each material's surface and lubricating oil adhered thereto. The conventional composite material AO3 is cast iron, the material AO4 contains 35 wt. % of $Fe_3O_4$ in a matrix of $Al_2O_3$ similar to that represented by curve AO4 in FIG. 6, the material AO5 is a material in which $Zro_2$ is sprayed on the surface of a substrate, the material BO6 is a cast iron substrate plated with Cr, and the material BO7 is ion nitride cast iron. The materials AO3 to AO5 are used conventionally for lining cylinders of an internal combustion engine and the materials BO6 and BO7 are used for piston rings in such cylinders.

The composite material MO1 according to the invention and shown in FIG. 7 contains 10 wt. % of $Fe_3O_4$ in a matrix of Fe, and similar to the material represented by curve MO1 in FIG. 6. It is seen from FIG. 7 that the composite material MO1 exhibits the smallest contact angle, best wettability with respect to the lubricating oil. The composite materials MO1, MO2 according to the invention exhibit smaller frictional coefficients than those of the conventional composite materials AO3, AO4 (FIG. 6) because of their greater wettability by lubricating oil.

Table 3 below shows the examined results of the presence or absence of a component of detergent ($CaCO_3$) on the surface of low friction composite material using ESCA and EPMA. For the composite material MO1 containing $Fe_3O_4$ in a matrix of Fe, no component of detergent was detected on its surface. Similarly no detergent was found on the surface of A21 formed of cast iron. On the other hand, for the conventional materials A32 using $Si_3N_4$ in a matrix phase and AO4 using $Al_2O_3$ in a matrix, a component of a detergent was detected on the surface of the material. It is apparent from the foregoing that the reason for the greater wettability of the composite material MO1 with respect to lubricating oil results from the fact that components of detergent do not adhere to its surface.

TABLE 3

| material | Y/N if detergent ($CaCO_3$) detected |
|---|---|
| A21 cast iron | NO |
| A32 $Fe_3O_4$—$Si_3N_4$ | YES |
| A04 $Fe_3O_4$—$Al_2O_3$ | YES |
| M01 $Fe_3O_4$—Fe | NO |

Figure 8:
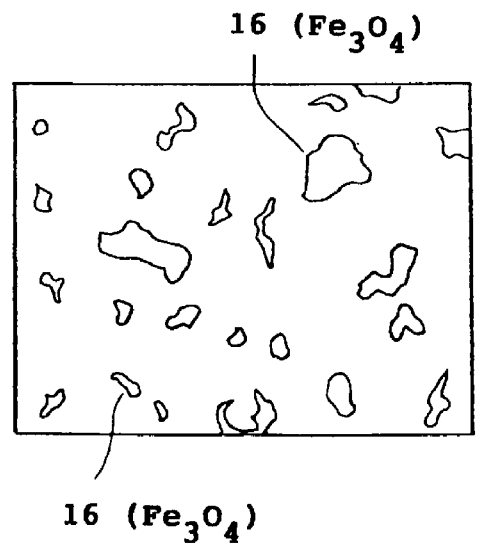
FIG. 8 is a pictorial view of the structure of a low friction composite material according to the second embodiment of the invention.

FIG. 8 schematically illustrates the structure of the composite material containing $Fe_3O_4$ in a matrix of Fe according to the present invention. As shown by numeral 16 in FIG. 8, the $Fe_3O_4$ is dispersed in an island-like manner within the matrix of Fe. It should be noted that similar characteristics are obtained if Fe sulfide, Fe nitride or Fe silicate are substituted for Fe oxide as an additive to the matrix of Fe.

THIRD EMBODIMENT

According to the present invention, the surface of a cylinder to be lubricated by a lubricating oil is formed of different composite materials specifically suited for, respectively, a boundary lubricating area (including a mixed lubricating area) and a fluid lubricating area. In that manner, the friction coefficient of the entire cylinder is minimized.

Table 4 shows the measured results of a contact angle of lubricating oil with respect to a material usable as a sliding member such as an engine cylinder. Plate materials AO4 to AO9, MO1, A21,A31 to A33 are used for lining an engine cylinder, and pin materials BO6 to BO8 are used for a piston pin. The plate materials MO1, AO4, A31 to A33, formed of $Fe_3O_4$/Fe, $Fe_3O_4$/$Al_2O_3$, FeS/$Al_2O_3$, $Fe_3O_4$/$Si_3N_4$ and Fe—Si/$Si_3N_4$, respectively, exhibit relatively small contact angles. That is, the composite materials MO1, AO4, A31 to A33 using the Fe oxide, Fe sulfide or compounds of Fe and Si have contact angles less than about 11 degrees and, therefore, are excellent in wettability by lubricating oil. (It is to be noted that in the above, A/B represents the composite material in which grains of A are dispersed in the matrix of B). The materials AO5 to AO9 and A21 formed of $ZrO_2$, $Al_2O_3$, $Cr_2O_3$, $Al_2O_3$-MgO, respectively, have contact angles of about 25 degrees or more and, therefore, poor wettability by lubricating oil. Conversely, the pin material BO7 formed of ion nitride iron is relatively small in contact angle and has a good wettability by lubricating oil. However, the pin materials BO6 and BO8 formed of Cr plated cast iron and $Si_3N_4$, respectively, exhibit large contact angles and, therefore, have poor wettability by lubricating oil.

TABLE 4

| member | material | contact angle degree |
|---|---|---|
| plate A05 | $ZrO_2$ | 36 |
| plate A06 | $Al_2O_3$ | 39 |
| plate A07 | $Cr_2O_3$ | 33 |
| plate A08 | $Al_2O_3$—$ZrO_2$ | 39.5 |
| plate A09 | $Al_2O_3$—MgO | 37 |
| plate M01 | $Fe_3O_4$/Fe | 5 |
| plate A04 | $Fe_3O_4$/$Al_2O_3$ | 11 |
| plate A21 | cast iron | 25 |
| plate A31 | FeS/$Al_2O_3$ | 8.5 |
| plate A32 | $Fe_3O_4$/$Si_3N_4$ | 10 |
| plate A33 | Fe—Si/$Si_3N_4$ | 10.5 |
| pin B06 | Cr plated cast iron | 32 |
| pin B07 | ion Fe nitrade | 19 |
| pin B08 | $Si_3N_4$ | 28 |

Figure 9:
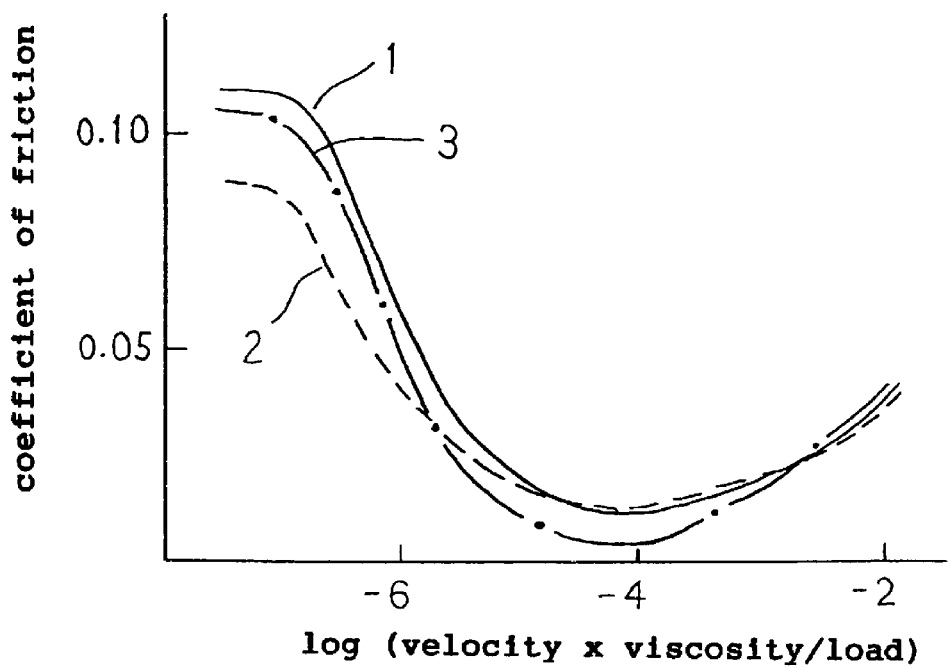
FIG. 9 is a diagram showing frictional characteristics of low friction composite materials according to the present invention.

FIG. 9 includes so-called STRYIBECK curves that illustrate friction characteristics of a combination of materials selected from Table 4. The abscissa and ordinate in FIG. 9 represent the logarithm of ((velocity×viscosity)/load) and frictional coefficient, respectively. Curve 1 in FIG. 9 represents the friction coefficient of a combination of materials in which cast iron (A21) is selected as a plate material and Cr plated cast iron (BO6) is selected as a pin material. Both of the materials A21 and BO6 having a poor wettability by lubricating oil. Curve 2 of FIG. 9 represents the friction characteristic of a combination of materials in which $Fe_3O_4$/Fe (MO1) is selected as a plate material and ion nitride iron (BO7) is selected as a pin material; that is a combination of materials MO1 and BO7, both having good wettability by lubricating oil. The curve 3 of FIG. 9 represents the friction characteristic of a combination of materials in which $ZrO_2$ (AO5) is selected as a plate material and ion nitride iron (BO7) is selected as a pin material; that is, a combination of a material AO5 having poor wettability by lubricating oil and a material BO7 having good wettability by lubricating oil.

It is apparent from the curve 2 (a combination of materials MO1/BO7) in FIG. 9 that in the so-called boundary lubricating area and the mixed lubricating area where the value of the logarithm of ((velocity x viscosity/load) is small, the friction coefficient of a combination of a material MO1 having good wettability by lubricating oil and a material BO7 also having good wettability by lubricating oil is smaller than those of the combinations of the other materials represented by curves 1 and 3. In addition, curve 3 (a combination of materials AO5/BO7) in FIG. 9 shows that in the so-called fluid lubricating area where the value of the logarithm of ((velocity×viscosity/load) is large, the friction coefficient of a combination of a material AO5 having a poor wettability by lubricating oil and a material BO7 having a good wettability by lubricating oil is smaller than those of the combinations of the other materials of curves 1 and 2. Accordingly, in the boundary lubricating area and the mixed lubricating area of an inner surface of an engine cylinder, a combination of $Fe_3O_4$/Fe and ion nitride iron (a combination of the materials MO1/BO7) is used, and in the fluid lubricating area of the inner surface of the cylinder, a combination of $ZrO_2$ and ion nitride iron (a combination of materials AO5/BO7) is used, whereby the friction coefficient of the entire surface of the engine cylinder can be minimized. As will be apparent from Table 4, similar results can be obtained by substituting a combination of $Fe_3O_4$/$Al_2O_3$ and ion nitride iron, a combination of FeS/$Al_2O_3$ and ion nitride iron, a combination of $Fe_3O_4$/$Si_3N_4$ and ion nitride iron, or a combination of Fe-Si/$Si_3N_4$ and ion nitride iron for the combination of $Fe_3O_4$/Fe and ion nitride iron.

Figure 10:
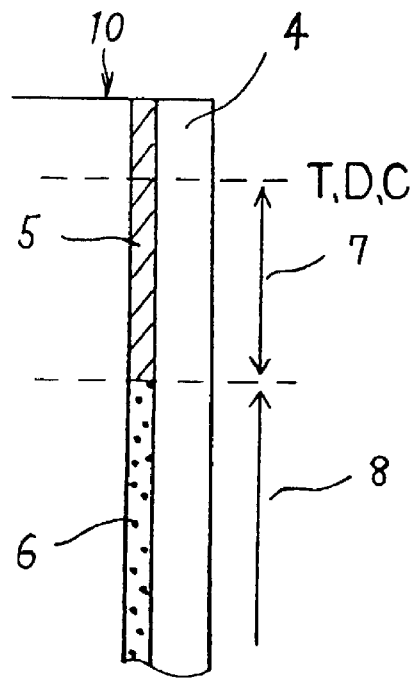
FIG. 10 is a sectional view of an engine cylinder liner incorporating low friction composite materials according to the present invention.

FIG. 10 is a cross sectional view in which combinations of low frictional composite materials according to the present invention are applied to an engine cylinder liner 10 whose substrate 4 is cast iron. The liner forms an engagement surface for engaging a reciprocating piston (not shown). Included in the engagement surface along the piston's path of movement are adjoining first and second length portions 7 and 8. The first length portion 7 includes a boundary lubricating area and a mixed lubricating area both adjacent to an outer end of the cylinder in the vicinity of T.D.C. of the piston. A section of the liner 10 corresponding to the first length portion 7 is formed of a composite material 5 comprising $Fe_3O_4$/Fe having a good wettability by lubricating oil. The second length portion 8 includes a fluid lubricating area adjacent to an inner end of the cylinder, intermediary between T.D.C. and B.D.C. of the piston. A section 6 of the liner 10 corresponding to the second length portion 8 is formed by a composite material comprising $ZrO_2$ having poor wettability by lubricating oil. The composite material 5 in the boundary and mixed lubricating areas adjacent to an outer end of the cylinder (in the vicinity of T.D.C. of the piston) also can be formed of $Fe_3O_4$/$Al_2O_3$, FeS/$Al_2O_3$, $Fe_3O_4$/$Si_3N_4$ or Fe-Si/$Si_3N_4$, rather than $Fe_3O_4$/Fe.

Figure 11:
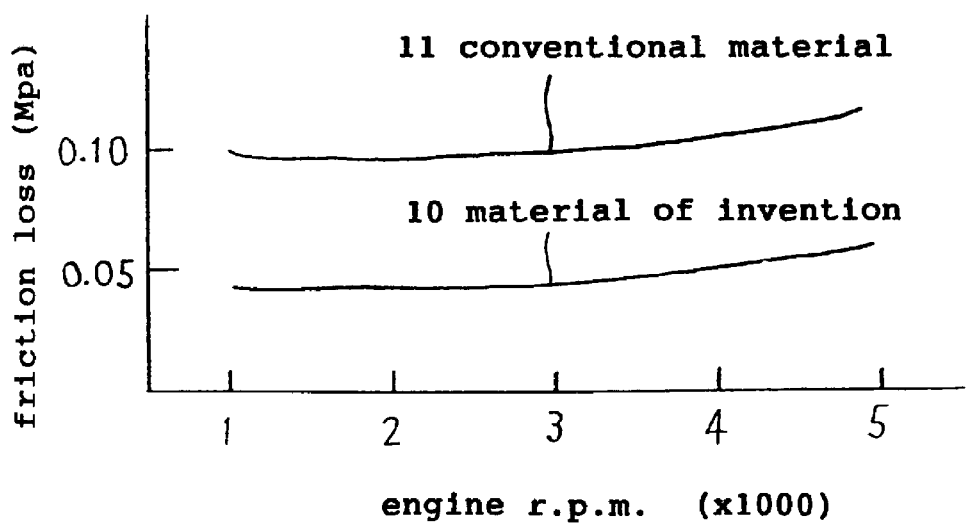
FIG. 11 is a diagram showing a relationship between the number of revolutions of an engine and frictional loss thereof.

FIG. 11 displays curves representing friction loss (Mpa) versus engine r.p.m. (×1000) for engines employing cylinder liners formed of either the composite material of the invention or conventional material. The curves were obtained by performing bench tests to measure frictional loss (indicated by cylinder pressure). For curve 10 data the materials $Fe_3O_4$/Fe and $ZrO_2$ were used, respectively, for the composite materials 5 and 6 corresponding to the lubricating areas 7 and 8 at the surface of the cylinder liner 10 (FIG. 10). Ion nitride cast iron was used for a piston ring. As can be seen from FIG. 11, during an overall range of operating conditions, the friction loss of an engine having cylinder liners 10 formed of the composite material according to the invention was about one half of the friction loss of an engine having cylinder liners formed of conventional composite material. Similar improvement in performance is provided by engines in which the cylinder liner materials 5 and 6 constitute, respectively, a combination of $Fe_3O_4$/$Al_2O_3$ and $ZrO_2$, a combination of FeS/$Al_2O_3$ and $ZrO_2$, or a combination of $Fe_3O_4$/$Si_3N_4$ and $ZrO_2$ substituted for the combination of $Fe_3O_4$/Fe and $ZrO_2$.

Thus, the present invention provides for different length portions of an engine cylinder a material specifically suitable for the lubricating requirements thereof. Accordingly, the friction coefficient is minimized over the entire length of the cylinder. By also employing for the piston ring, a material having a good oil wettability, its frictional loss is reduced significantly over substantially the entire operating range of the engine to thereby increase engine life.

Obviously, many modifications and variations of the present invention are possible in light of the above teachings. It is to be understood, therefore, that the invention can be practiced otherwise than as specifically described.

What is claimed is:

1. An assembly comprising:
   an internal combustion engine cylinder defining an engagement surface;
   a piston member engaging said engagement surface and movable relative thereto along a path of movement;
   supply means for applying lubricating oil to said engagement surface so as to provide therewith a first lubricated length portion extending along said path; and a second lubricated length portion adjoining said first length portion along said path; and wherein said first length portion is adjacent to an outer end of said cylinder and is formed of a first material providing a first contact angle of less than 11° with respect to lubricating oil adhered thereto, and said second length portion is inwardly adjacent to said first length portion and is formed of a second material having with respect to lubricating oil adhered thereto a second contact angle greater than 25°.

2. An assembly according to claim 1 wherein said first length portion includes a boundary lubricating area and a mixed lubricating area, and said second length portion includes a fluid lubricating area.

3. An assembly according to claim 1 wherein said first material is a composite material selected from the group consisting of $Fe_3O_4/Fe$, $Fe_3O_4/Al_2O_3$, $FeS/Al_2O_3$, $Fe_3O_4/Si_3N_4$, and $Fe—Si/Si_3N_4$.

4. An assembly according to claim 3 wherein said second material is a composite material selected from the group consisting of $Zro_2$, $Al_2O_3$, $Cr_2O_3$, $Si_3N_4$, $Al_2O_3$-$ZrO_2$, $Al_2O_3$-$MgO$, and Cr plated cast iron.

5. An assembly according to claim 1 wherein said first material exhibits a given level of wettability by lubricating oil, and said second material exhibits a wettability by lubricating oil substantially less than said given level.

6. An assembly according to claim 5 wherein said first material is a composite material selected from the group consisting of $Fe_3O_4/Fe$, $Fe_3O_4/Al_2O_3$, $FeS/Al_2O_3$, $Fe_3O_4/Si_3N_4$, and $Fe-Si/Si_3N_4$.

7. An assembly according to claim 6 wherein said second material is a composite material selected from the group consisting of $ZrO_2$, $Al_2O_3$, $Cr_2O_3$, $Si_3N_4$, $Al_2O_3$-$ZrO_2$, $Al_2O_3$-$MgO$, and Cr plated cast iron.

8. An assembly according to claim 5 wherein said first contact angle is less than 11° and said second contact angle is greater than 25°.

9. An assembly according to claim 8 wherein said first material is a composite material selected from the group consisting of $Fe_3O_4/Fe$, $Fe_3O_4/Al_2O_3$, $FeS/Al_2O_3$, and $Fe_3O_4/Si_3N_4$ and $Fe-Si/Si\ N_4$.

10. An assembly according to claim 9 wherein said second material is a composite material selected from the group consisting of $ZrO_2$, $Al_2O_3$, $Cr_2O_3$, $Si_3N_4$, $Al_2O_3$-$ZrO_2$, $Al_2O_3$-$MgO$, and Cr plated cast iron.

11. An assembly comprising:
in internal combustion engine cylinder defining an engagement surface;
a piston member engaging said engagement surface and movable relative thereto along a path of movement;
supply means for applying lubricating oil to said engagement surface so as to provide therewith a first lubricated length portion extending along said path; and a second lubricated length portion adjoining said first length portion along said path; and wherein said first length portion is adjacent to an outer end of said cylinder and is formed of a first material exhibiting a given level of wettability by lubricating oil, said first material being a composite material selected from the group consisting of $Fe_3O_4/Fe$, $Fe_3O_4/Al_2O_3$, $FeS/Al_2O_3$, $Fe_3O_4/Si_3N_4$, and $Fe-Si/Si_3N_4$; and said second length portion is inwardly adjacent to said first length portion and is formed of a second material exhibiting a wettability by lubricating oil less than said given level.

12. An assembly according to claim 11 wherein said first length portion includes a boundary lubricating area and a mixed lubricating area, and said second length portion includes a fluid lubricating area.

13. An assembly according to claim 12 wherein said second material is a composite material selected from the group consisting of $ZrO_2$, $Al_2O_3$, $Cr_2O_3$, $Si_3N_4$, $Al_2O_3$-$ZrO_2$, $Al_2O_3$-$MgO$, and Cr plated cast iron.

* * * * *